METHOD OF EPITAXIALLY PRODUCING p-n JUNCTIONS IN SILICON
Filed July 13, 1964
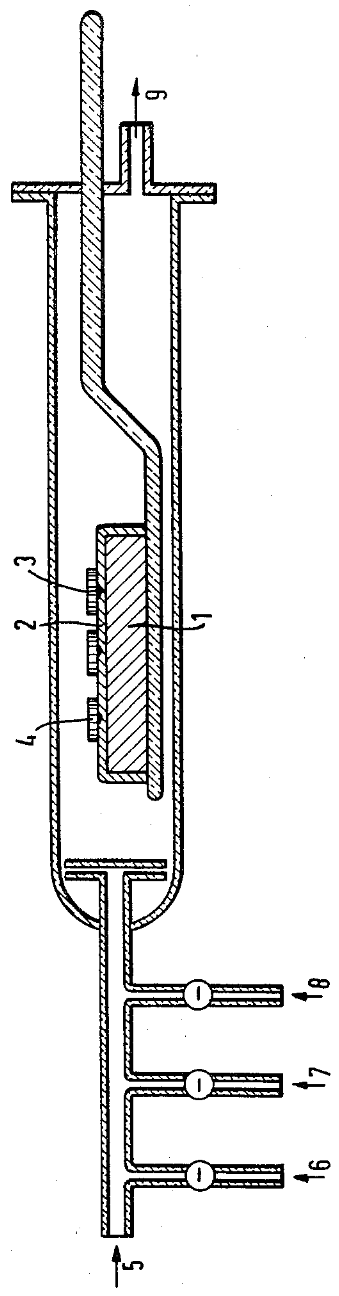

3,409,481

METHOD OF EPITAXIALLY PRODUCING p-n JUNCTIONS IN SILICON

Hans Merkel, Erlangen, and Siegfried Leibenzeder, Erlangen-Buchenbach, Germany, assignors to Siemens Aktiengesellschaft, a corporation of Germany Filed July 13, 1964, Ser. No. 382,009
Claims priority, application Germany, July 17, 1963, S 86,210
2 Claims. (Cl. 148—175)

ABSTRACT OF THE DISCLOSURE

The present invention provides for the production of improved epitaxial p-n junction devices which exhibit good rectifying characteristics, namely a sharply marked current change when passing from forward to reverse operation, as well as an abrupt current increase when the breakdown voltage is exceeded, and which also possess high blocking ability manifested by a relatively high peak inverse voltage. According to the invention, monocrystalline p-type substrates of silicon are placed on top of a heatable body in thermal contact therewith. The top surface of the heater consists entirely or partially of silicon alloyed with an element from the second, third or fifth group of the periodic system. The substrates are then heated by means of the heater body in the reaction vessel to a temperature between 900 and 1400° C., preferably 1150 to 1250° C., in a flow of gaseous mixture composed of hydrogen halide and a silicon halogen compound for a period of 1 to 60 minutes. As a result, the substrates are subjected to etching which exposes a completely undisturbed and planar crystalline surface structure. Subsequently, the composition of the gas supply is changed thereby epitaxially precipitating n-type silicon upon the substrates in the same vessel and while maintaining the temperature within the above-mentioned range. Particularly suitable as alloying components for the silicon heater surface are those elements of the second, third and fifth groups in the periodic system that form with silicon a simple eutectic system of degenerated eutectic. This applies, for example, to the metals gallium and indium from the third B-group, to antimony from the fifth B-group, and to zinc from the second B-group of the periodic table.

Our invention relates to a method of producing p-n junctions in silicon by growing epitaxial zones upon monocrystalline silicon substrates of different conductance type heated in a reaction vessel while being exposed to a flow of gaseous silicon compound.

It is an object of our invention to afford the production of improved epitaxial p-n junction devices which exhibit good rectifying characteristics, namely a sharply marked current change when passing from forward to reverse operation, as well as an abrupt current increase when the breakdown voltage is exceeded, and which also possess high blocking ability manifested by a relatively high peak inverse voltage.

According to the invention, we place monocrystalline p-type substrates of silicon on top of a heatable body in thermal contact therewith, the top surface of the heater consisting entirely or partially of a silicon alloy with an element from the second, third or fifth group of the periodic system. We then heat the substrates by means of the heater body in the reaction vessel to a temperature between 900 and 1400° C., preferably 1150 to 1250° C., in a flow of gaseous mixture composed of hydrogen halide and a silicon halogen compound for a period of 1 to 60 minutes. As a result, the substrates are subjected to etching which exposes a completely undisturbed and planar crystalline surface structure. Subsequently we change the composition of the gas supply and thereby epitaxially precipitate n-type silicon upon the substrates in the same vessel and while maintaining the temperature within the above-mentioned range.

Particularly suitable as alloying components for the silicon heater surface are those elements of the second, third and fifth groups in the periodic system that form with silicon a simple eutectic system of degenerated composition. This applies, for example, to the metals gallium and indium from the third B-group, to antimony from the fifth B-group, and to zinc from the second B-group of the periodic table.

The invention will be further described with reference to the accompanying drawing in which an embodiment of suitable processing equipment is illustrated by way of example.

The equipment comprises an elongated and horizontally mounted tubular vessel. Mounted in the vessel is a heater 1 consisting of a flat and smooth slab of graphite upon which a silicon layer 2 of 0.2 to 0.3 mm. thickness is precipitated. A number of gallium balls 3 of about 1 mm. diameter are placed upon different, mutually spaced localities of the planar top surface. Thereafter the vessel is closed and the heater 1 is heated for about 10 minutes in a hydrogen current to a temperature of 1150 to 1250° C. This is done, for example, by means of a high-frequency induction coil which surrounds the tubular vessel at the locality of the graphite slab. The gallium penetrates completely into the silicon layer. After the device is permitted to cool down to normal room temperature, the localities treated with gallium are clearly visible by their difference in color.

We now place monocrystalline substrates upon the gallium-alloyed localities. The illustrated substrates 4 are circular flat discs of p-type silicon having a specific resistance of 200 ohm/cm., for example. They are in face-to-face contact with the silicon-coated top surface of the heater and thus in good heat contact therewith. The heater is then again heated to bring the substrates in the vessel to a temperature of 1150 to 1250° C. Simultaneously a mixture of gas is passed through the vessel. The mixture consists of 1 mole hydrogen, 0.16 mole hydrogen chloride and 0.04 mole gaseous silicon tetrachloride. This stage of the process has the effect of subjecting the substrates to etching with the result that they assume a fully planar shape since all damaged or contaminated atom layers are removed from the surface so that a completely undisturbed crystalline plane is laid bare.

After 10 minutes, the supply of etching gas is discontinued and instead, a mixture of hydrogen and silicon tetrachloride in a molar ratio of 25:1 is passed through the vessel. The gas mixture is given an addition of phosphorus(III)-chloride in such a quantity that n-type silicon having a specific resistance of 5 ohm/cm. is epitaxially grown on the substrates. Denoted by 5, 6, 7 and 8 on the drawing are the gas inlets for supplying hydrogen, hydrogen chloride, silicon tetrachloride and phosphorus(III)-chloride. The spent gases leave the vessel through an outlet 9.

The method can be performed analogously with the aid of silicon heaters which are alloyed with indium, antimony, zinc or with another element from the second, third or fifth groups of the periodic table, for example magnesium or arsenic. Instead of epitaxially growing phosphorus-doped n-type silicon, the gas mixture employed for the epitaxial growth may also be given an addition of arsenic or antimony, for example in the form of their respective halogen compounds.

The specific resistance of the grown layer depends upon the partial pressure of the dopant added to the reaction gas. For example when the partial pressure of admixed gaseous antimony(III)-chloride is 1 torr, the epitaxially grown layer of n-type silicon has a specific resistance of about 0.02 ohm/cm. and is accurately reproducible.

The p-n junction produced by the method according to the invention are distinguished by good and sharp rectifier characteristics and small amounts of reverse currents; at 400 v. the inverse current, as a rule, amounts to no more than a few $10^{-8}$ A./mm.$^2$.

Instead of using as a heater a graphite slab coated with silicon, the heater may also consist of compact silicon having its top surface alloyed in the above-described manner, although it may become necessary in this case to initially employ radiation or resistance heating for shortening the heating-up period.

We claim:

1. The method of epitaxially producing p-n junctions on silicon monocrystalline substrates, which comprises forming, in a processing vessel on top of a silicon-surfaced heater, an alloy of the surface silicon with a metal selected from the group consisting of the elements in the second, third and fifth groups of the periodic system which forms with silicon a simple eutectic system, placing substantially planar substrates of monocrystalline p-type silicon face-to-face upon the silicon-alloy surface in heat conducting contact therewith, heating the substrates on the heater surface to a temperature of 1150 to 1250° C. for 1 to 60 minutes and simultaneously subjecting the heated substrates to a flow of a gas mixture composed of hydrogen, hydrogen halide and a silicon-halogen compound whereby the substrates are etched to planar shape, and thereafter cutting off the hydrogen halide supply and starting the flow of a donor-halogen compound thereby changing the gas composition and growing at said temperatures an epitaxial layer of n-type silicon on the substrates.

2. The method of epitaxially producing p-n junctions on silicon monocrystalline substrates, which comprises forming, in a processing vessel on top of a silicon-surfaced heater, an alloy of the surface silicon with a metal selected from the group consisting of the elements in the second, third and fifth groups of the periodic system which forms with silicon a simple eutectic system, placing substantially planar substrates of monocrystalline p-type silicon face-to-face upon the silicon-alloy surface in heat conducting contact therewith, heating the substrates on the heater surface to a temperature of 1150 to 1250° C. for 1 to 60 minutes and simultaneously subjecting the heated substrates to a flow of a gas mixture composed of hydrogen, hydrogen halide and a silicon-halogen compound whereby the substrates are etched to planar shape, and thereafter changing the gas mixture to a composition of hydrogen and silicon-tetrachloride in the molar ratio 25:1 with an addition of gaseous antimony(III)-chloride having a partial pressure of about 1 torr while maintaining said substrates heated to said temperature, whereby antimony-doped n-type silicon of 0.02 ohm/cm. specific resistance is epitaxially grown on the substrates.

References Cited

UNITED STATES PATENTS

| | | | |
|---|---|---|---|
| 3,173,814 | 3/1965 | Law | 148—175 |
| 3,243,323 | 3/1966 | Corrigan et al. | 148—175 |
| 3,142,596 | 7/1964 | Theuerer | 148—175 |
| 3,172,792 | 3/1965 | Handelman | 148—175 |
| 3,291,657 | 12/1966 | Sirtl | 148—175 |

FOREIGN PATENTS

| | | |
|---|---|---|
| 1,364,522 | 5/1964 | France. |

OTHER REFERENCES

Basseches et al.: Metallurgy of Semiconductor Materials Aug. 30–Sept. 1, 1961, Interscience Publishers, vol. 15, pages 69–80.

Tung: Metallurgy of Semiconductor Materials, Aug. 30–Sept. 10, 1961, Interscience Publishers, vol. 15, pages 87–102, in particular page 94.

HYLAND BIZOT, *Primary Examiner.*

P. WEINSTEIN, *Assistant Examiner.*